United States Patent [19]

Fisher et al.

[11] Patent Number: 4,618,387
[45] Date of Patent: Oct. 21, 1986

[54] SPLICING METHODS FOR AN EXTRUDED HANDRAIL

[75] Inventors: Marvin D. Fisher, Murrysville Boro, Pa.; Louis E. Bobsein, Basking Ridge, N.J.

[73] Assignee: Westinghouse Electric Corp., Pittsburgh, Pa.

[21] Appl. No.: 709,874

[22] Filed: Mar. 8, 1985

[51] Int. Cl.⁴ .................. B29C 47/00; B32B 31/04; B32B 31/18

[52] U.S. Cl. .................. 156/244.11; 156/137; 156/138; 156/244.18; 156/257; 156/258; 156/304.1; 156/304.2; 156/304.3; 198/335; 198/337; 198/338

[58] Field of Search ............ 156/143, 137, 138, 157, 156/258, 304.1, 304.2, 304.3, 244.11, 244.18, 257; 198/335, 337, 338

[56] References Cited

U.S. PATENT DOCUMENTS

| | | | |
|---|---|---|---|
| 2,686,585 | 8/1954 | Margles et al. | 198/335 |
| 2,733,181 | 1/1956 | Riedesel | 156/138 |
| 2,879,881 | 3/1959 | Tilton | 198/335 |
| 3,487,871 | 1/1970 | Kanamori | 156/304.3 |
| 3,633,725 | 1/1972 | Smith | 198/335 |
| 3,719,265 | 3/1973 | Redding et al. | 198/335 |
| 3,949,858 | 4/1976 | Ballocci et al. | 198/335 |
| 4,215,516 | 8/1980 | Huschle et al. | 156/304.3 |
| 4,453,910 | 6/1984 | Ball | 425/12 |

Primary Examiner—Caleb Weston
Attorney, Agent, or Firm—D. R. Lackey

[57] ABSTRACT

A method of splicing a length of extruded handrail having a C-shaped cross-sectional configuration, a substantially flat inner drive surface, and a plurality of spaced, longitudinally extending inextensible members embedded in the body of the handrail. The ends of the handrail are squared, aligned, and butted. Longitudinally extending grooves are cut into the flat drive surface, through and on both sides of the butt joint, in the spaces between the embedded inextensible members. Predetermined lengths of inextensible members and elastomeric material are placed in the grooves, and bonded to the surfaces which define the grooves. In another embodiment, the grooves are extruded into the flat drive surface at the same time the handrail is extruded. In either embodiment, the ends of the handrail may be bonded together prior to, or simultaneously with, the bonding of the inextensible members and elastomeric material with the groove surfaces.

21 Claims, 18 Drawing Figures

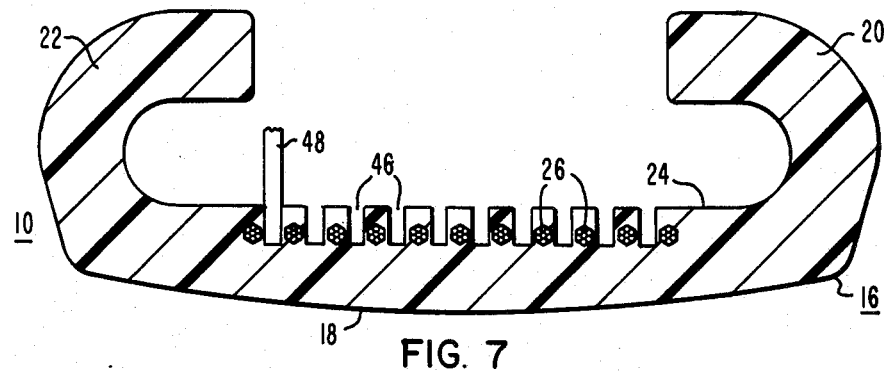
FIG. 7
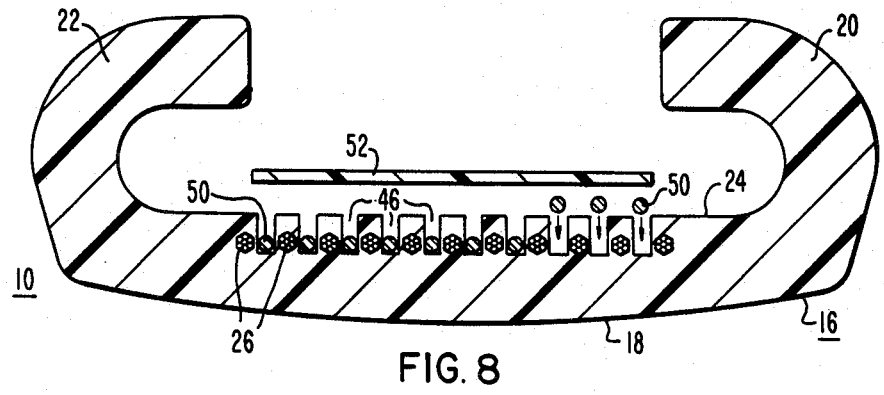
FIG. 8
FIG. 9
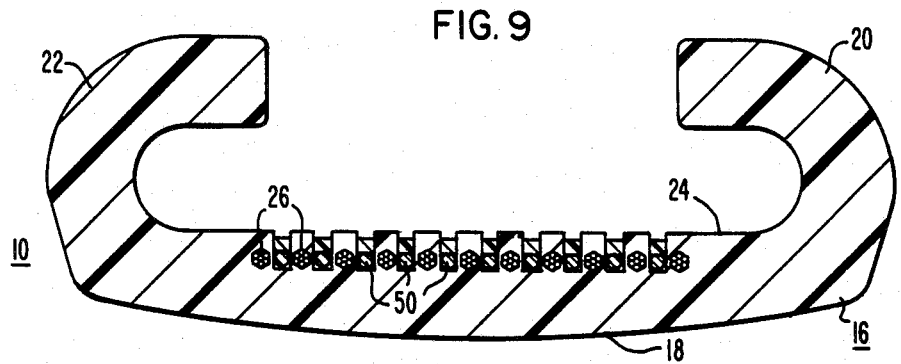

SPLICING METHODS FOR AN EXTRUDED HANDRAIL

BACKGROUND OF THE INVENTION

1. Field of the Invention

The invention relates in general to handrails for transportation apparatus, such as escalators and moving walks, and more specifically to new and improved methods of splicing extruded handrails.

2. Description of the Prior Art

Handrails for transportation apparatus may be built up of several plies of canvas and rubber, and molded, or, they may be extruded using a suitable polymeric material. The extrusion process is attractive from the economic viewpoint, as long runs may be made, with desired lengths of handrail simply being cut from the longer length. It is desirable to maintain the economic attractiveness of the extruded handrail by providing new and improved splicing techniques which are equally suitable for factory and field splicing.

SUMMARY OF THE INVENTION

Briefly, the present invention relates to new and improved splicing methods for extruded handrails. The methods include the steps of forming spaced, longitudinally extending grooves in the flat inner drive surface of a predetermined length of extruded handrail, at least adjacent to the ends of the handrail to be joined, aligning the ends to form a tight butt joint, and bonding, such as by heat fusing, the ends of the extruded handrail to consolidate the butt joint and create a continuous handrail loop.

The grooves may be cut longitudinally into the handrail, on both sides of the butt joint, before, or after, the ends of the handrail are bonded. Alternatively, the grooves may be extruded into the inner flat drive surface of the handrail at the time the main body of the handrail is extruded. In the latter embodiment, the grooves may additionally function as driving tread.

In both embodiments, predetermined lengths of inextensible members, along with elastomeric material, are inserted into the grooves such that they extend across the butt joint and interleave with inextensible members already embedded in the body of the handrail. The inextensible members may be in the form of cords, such as stranded steel cable, bands, or other suitable configurations or material. The inextensible members and elastic material may be introduced into the grooves separately, or the inextensible members may be pre-coated with elastomeric material, as desired. In the latter embodiment, the cross-sectional configuration of the pre-coated members is preferably complementary with the groove configuration. Elastomeric material in the grooves is then bonded to the walls of the grooves, to complete the joint. The bonding, for example, may be accomplished by heat fusing, chemical reaction, or adhesive, and it may simultaneously bond the butted ends of the handrail, if not already bonded by a prior step.

BRIEF DESCRIPTION OF THE DRAWINGS

The invention may be better understood, and further advantages and uses thereof more readily apparent, when considered in view of the following detail description of exemplary embodiments, taken with the accompanying drawings in which:

FIGS. 7, 8 and 9 illustrate the steps of a first embodiment of the invention, directed to the reinforcement of the butt joint formed in the embodiments of FIGS. 2-6;

DESCRIPTION OF PREFERRED EMBODIMENTS

Figure 1:
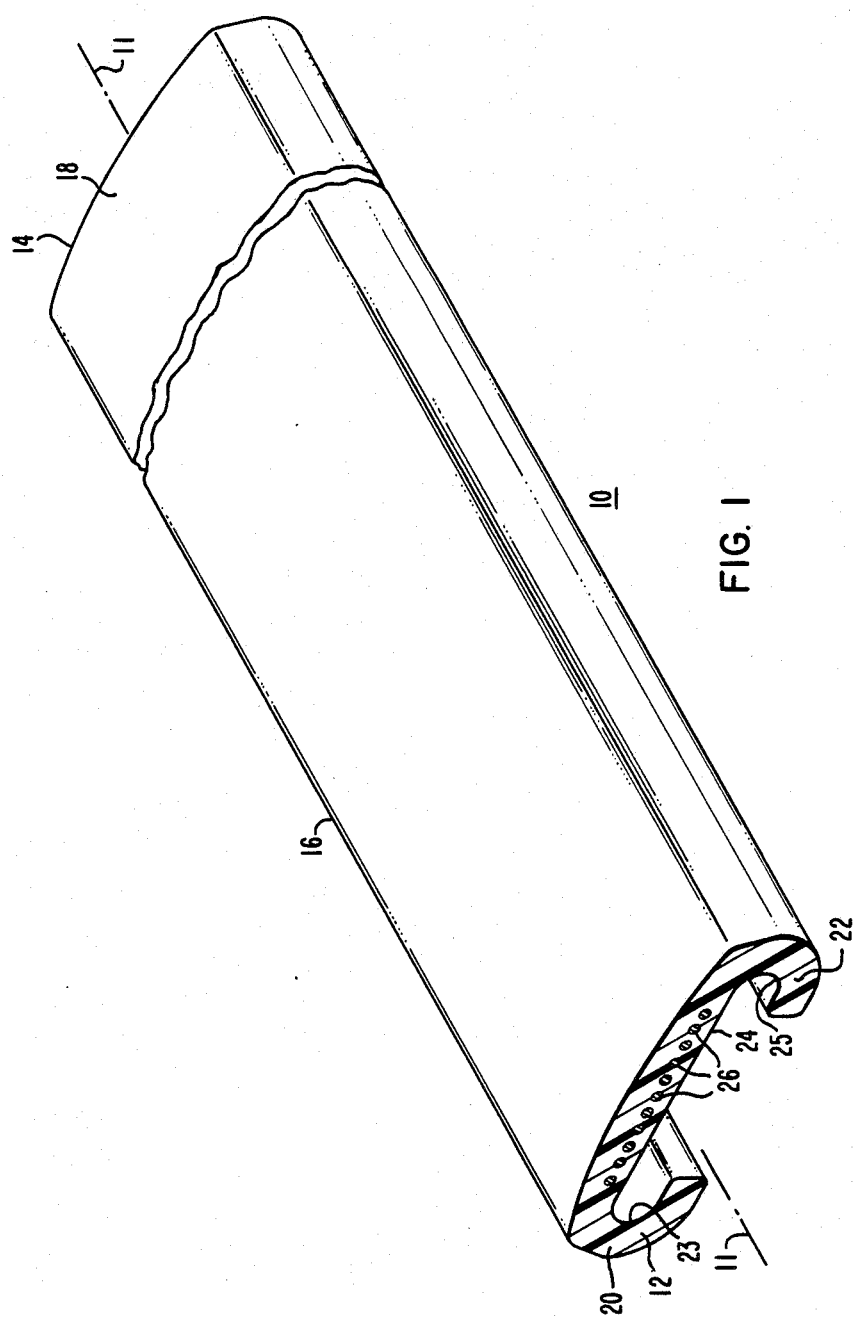
FIG. 1 is a perspective view of an extruded handrail which may be spliced according to the teachings of the invention.

Referring now to the drawings, and to FIG. 1 in particular, there is shown a length of extruded handrail 10 having a longitudinal axis 11. Extruded handrail 10 may be spliced according to the teachings of the invention. Handrail 10 is an elongated structure having first and second ends 12 and 14, respectively, to be joined, to form a continuous loop suitable for use on escalators and moving walks. Handrail 10 is extruded from a suitable elastomeric material, such as polyurethane, to form a substantially C-shaped body member 16 which includes a back or hand gripping portion 18, first and second curved side portions 20 and 22, respectively, and a substantially flat inner drive surface 24. Inner curved surfaces 23 and 25 are guide surfaces. U.S. Pat. No. 3,779,360, which is assigned to the same assignee as the present application, discloses a suitable arrangement for driving handrail 10 about a guided, closed loop.

The elastomeric material of body member 16 is extruded about a plurality of inextensible members 26. In a preferred embodiment of the invention, members 26 are in the form of standard steel cables having a predetermined diameter, such as 0.63 inch (1.59 mm).

Members 26 reinforce the handrail 10 and stabilize its dimensions during temperature and humidity changes. The members 26 also restrain the handrail 10 from elongating or stretching due to tension, while the handrail is driven about its closed guide loop.

Figure 2:
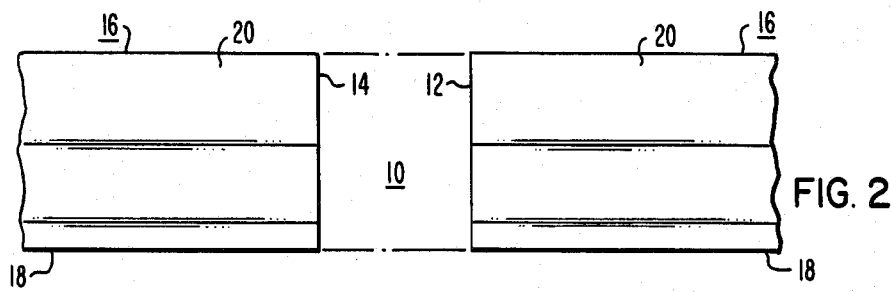
FIGS. 2, 3 and 4 illustrate steps of a new and improved method of joining the ends of a length of extruded handrail, such as the handrail shown in FIG. 1.

A step of the invention involves making a butt joint between the ends 12 and 14 of body member 16. A first method for making a butt joint is set forth in FIGS. 2, 3 and 4. As shown in FIG. 2, the ends 12 and 14 are squared, and, as shown in FIG. 3, a thin cross-sectional slice 32 of the handrail 10 is cut from one of the squared ends, to provide butt joint "matching" filler material.

Slice 32 has first and second ends 34 and 36. The short pieces of inextensible members 26 in slice 32 are removed and discarded.

Figure 4:
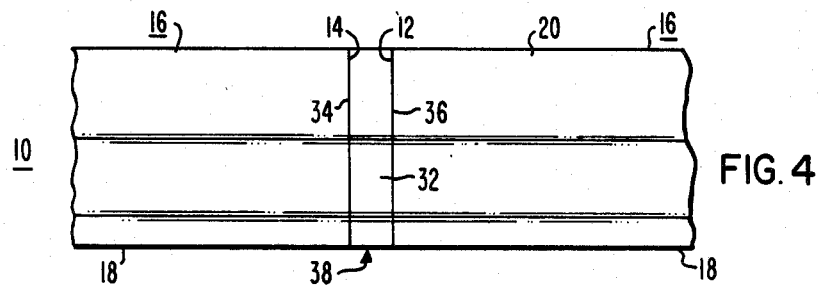

Ends 12, 14, 34 and 36 are then preheated, such as by a heating element. While still at an elevated temperature, the ends 12 and 14 are aligned with one another, with slice 32 therebetween. Ends 14 and 34 are in contact with one another, and ends 36 and 12 are in contact with one another, to effect a butt joint 38, as illustrated in FIG. 4. While pressure is applied to force the aligned ends together, additional heat is applied to the edges of joint 38 to effect a fused, heat sealed joint. Teflon coated fiberglass cloth provides an excellent release surface for polyurethane. The interface zone of joint 38 will be short, and only a small amount of elastomeric material extrudes out at the periphery of the joint. The joint 38 is then allowed to cool, to set the heat fused material in the joint area, and any extruded material extending outwardly from the joint is then carefully cut away and the area polished to remove all visible traces of the joint. In the field, a fixture containing electrically enerized heating elements may be used for the heat sealing step, while the same or different heating arrangements may be used in the factory.

Figure 3:
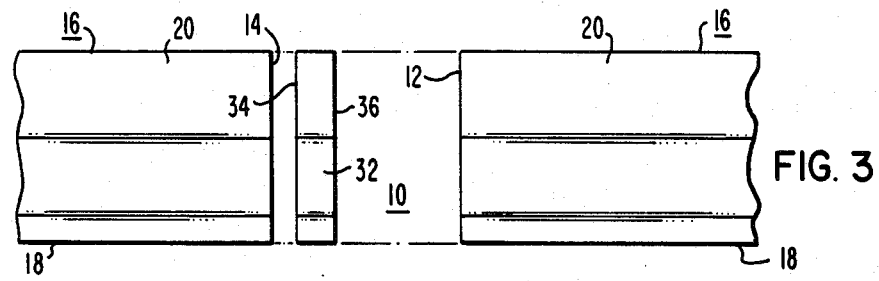
Figure 5:
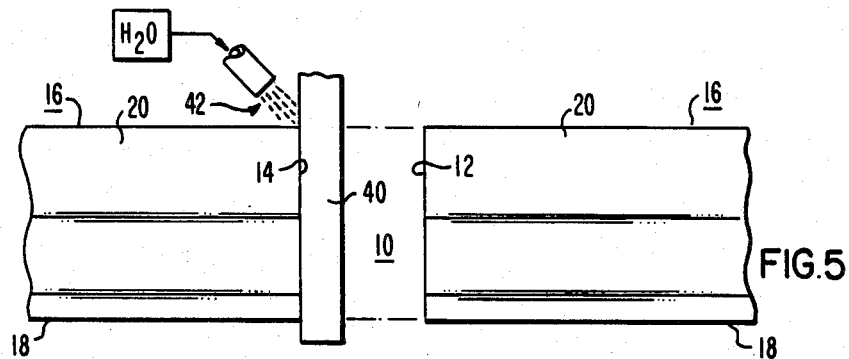
FIGS. 5 and 6 illustrate steps of another method of joining the ends of a length of extruded handrail, according to the teachings of the invention.
Figure 6:
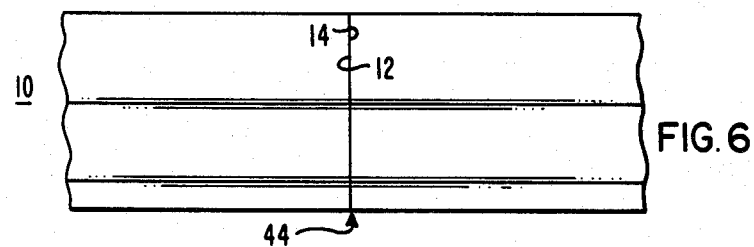

It has been found that the methods set forth in FIGS. 2, 3 and 4 may be simplified and improved if the step of squaring ends 12 and 14 utilizes an abrasive cut-off wheel 40, as shown in FIG. 5, with cooling water 42 being applied while the cut is being made. This arrangement compresses the elastomeric material of the body member 16 while the metallic members or cables 26 are being cut to a smooth finish. After the cut-off step, the compressed elastomeric material returns to its pre-compressed configuration, and the wire cables 26 appear to recede into the elastomeric body. The squared ends 12 and 14 are thus ready for joining without the necessity of providing filler material to prevent interference between the aligned cable ends. The aligned ends 12 and 14 may thus be heat fused and sealed, in the manner hereinbefore described relative to the first embodiment of the invention, to provide a butt joint 44, as shown in FIG. 6.

Another step of the method, shown in FIG. 7, is the forming of longitudinally extending, spaced, parallel grooves 46 in the flat drive surface 24. After the ends 12 and 14 are aligned, and either before or after the step of bonding the butt joints 38 or 44, the aligned ends are disposed in a die. Grooves 46 are then cut into the spaces located between the inextensible members or cables 26. A single cutting tool 48 may be used, or ganged cutting tools may be used, as desired. The cutting tool may be a water-cooled abrasive wheel, circular saw, or the like. The locating die and cutting tool arrangement should be set up to insure that thin accurate cuts can be made without nicking the cables 26 already embedded in the elastomeric material of the body member 16. The grooves 46 extend through the butt joint, and for a predetermined dimension on each side thereof.

Another step, shown in FIG. 8, is to prepare a plurality of inextensible members 50. Members 50 may be cut from the same cable used to form members 26, or they may be different, as desired. In any event, members 50 are sized such that their O.D. will fit the width dimension of grooves 46.

Cables 50 are disposed in grooves 46, and a thin sheet 52 of elastomeric material is disposed over the grooves. Sheet 52 has a length dimension which is about the same as the length dimension of the members 50. Heat is applied to the sheet 52 and the joint area, to cause sheet 52 to melt and flow into the grooves to surround members 50, as shown in FIG. 9. Extreme care must be taken to clean members 50 before placing them in grooves 46, in order to obtain the highest shear strength, i.e., the greatest friction between the cables and the surrounding elastomeric material, after the elastomeric material has cooled.

Figure 10:
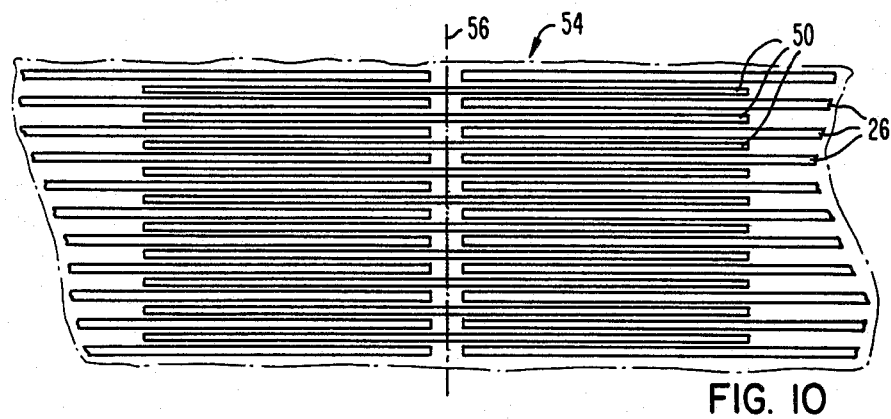
FIG. 10 illustrates an arrangement of inextensible members in the area of the butt joint, according to a first embodiment of the invention.

FIG. 10 is a plan view of a finished joint area 54, showing only the inextensible members or cables 26 and the joint reinforcing inextensible members or cables 50. The ends of members 26 are aligned, but they do not interfere with one another. The joint reinforcing cables 50 extend for a predetermined dimension on each side of joint centerline 56. By selecting members 50 of sufficient length, their adhesion to the surrounding material will create a shear strength greater than the tensile strength of members 26, which is the optimum joint strength. In one embodiment of the invention it was found that 24 inch cables, disposed 12 inches on either side of the centerline of the butt joint, achieved optimum joint strength. In other words, the joint strength was at least equal to the breaking strength of the cables. With shorter overlaps slippage occurred between the cable-elastomeric interface at lower load levels than cable potential.

Figure 11:
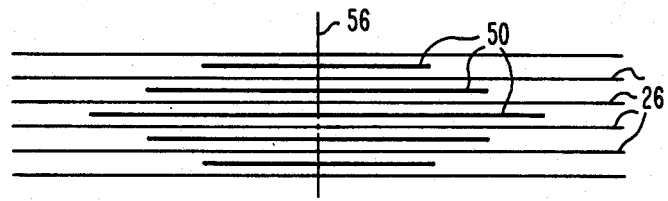
FIG. 11 illustrates an arrangement of the inextensible members in the area of the butt joint, arranged according to another embodiment of the invention.

While optimum joint strength is achieved by reinforcing cable arrangements shown in FIG. 10, the reinforcing in the joint area 54 increases the stiffness of the handrail in this area. Thus, any bending is transferred from the joint area 54 to the aligned ends of the reinforcing cables. This may be avoided by feathering the stress concentration, i.e., extending the stress concentration over a relatively long length, compared with the abrupt change from the joint area to the adjacent portions of the handrail. An exemplary embodiment of joint feathering is shown in FIG. 11.

More specifically, instead of using cables 50 of identical length, different length cables may be used, all disposed with their centers on joint centerline 56. For example, the shortest of the cables may be disposed on the two sides of the arrangement. The next innermost cables would be longer, etc., until reaching the innermost reinforcing member, which would be the longest. This arrangement eliminates the concentration of bending stresses, which may occur with the FIG. 10 arrangement.

Figure 12A:
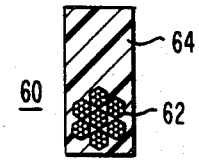
FIG. 12A is a greatly enlarged cross-sectional view of a pre-coated inextensible member shown in FIG. 12.
Figure 12:
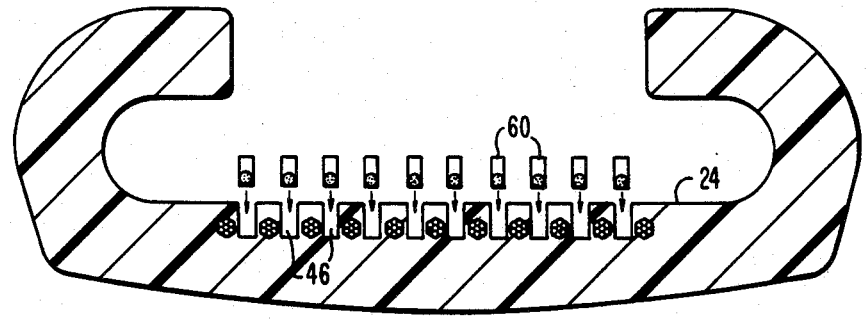
FIG. 12 illustrates pre-coating the inextensible members to match the rectangular groove configuration.
Figure 13:
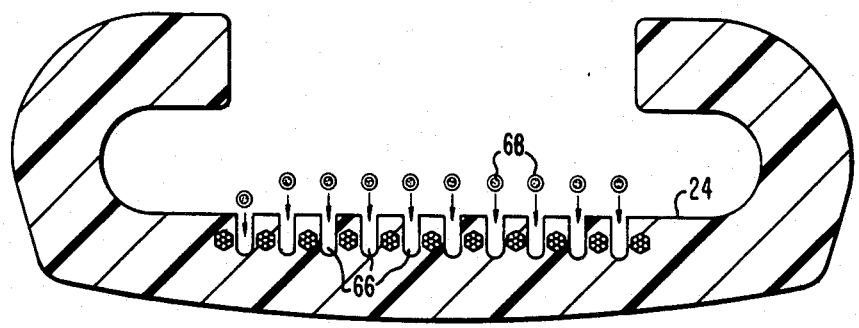
FIG. 13 illustrates pre-coating of the inextensible members to match a curved groove configuration.

In the embodiment of FIGS. 7, 8 and 9, it is important in assuring maximum joint strength that the cables 50 be free of oil and other contaminants. This makes it difficult to achieve optimum joint strength in the field. To eliminate this problem, the method of splicing the ends of an extruded handrail may include the step of pre-coating the cables 50 with an elastomeric material, such as shown in FIGS. 12 and 13. In a preferred embodiment of the invention, the cross-sectional configuration of the pre-coated cables closely match the cross-sectional configuration of the grooves. For example, as shown in FIG. 12, if grooves 46 have a rectangularly shaped cross-sectional configuration, pre-coated members 60 may be used which have a complementary rectangular configuration. FIG. 12A is a greatly enlarged cross-sectional view of a pre-coated member 60, which includes a cable 62 surrounded by elastomeric material 64, which may be the same elastomeric material used to form the body portion 16. Pre-coated members are simply inserted into the groove 46, and heat is applied to effect a bond.

A more practical groove configuration 66 is shown in FIG. 13, with the bottom of groove 66 being radiused. This is achieved by utilizing a radius on the outer periphery of the cutting tool which is used to cut the groove 66. The use of a radius on the outer periphery of the cutting tool will also reduce re-dressing costs associated with certain tools. The U-shaped groove 66 is also easier to clean, and it is easier to completely fill with elastomeric material. Thus, there is less potential for voids developing adjacent to the cable, which would reduce the mechanical strength of the joint. It also enables the use of round, pre-coated members 68 which are easier to manufacture and easier to use in the field.

In the new and improved splicing methods disclosed to this point, grooves in the drive surface 24 have been formed in the joint area after extrusion, utilizing a suitable cutting tool. While this is a practical method, it does require extreme care in the alignment of the tool with the handrail, which is difficult to achieve in the field. In another embodiment of the invention, the grooves are extruded into surface 24 at the same time body portion 16 is extruded.

Figure 14:
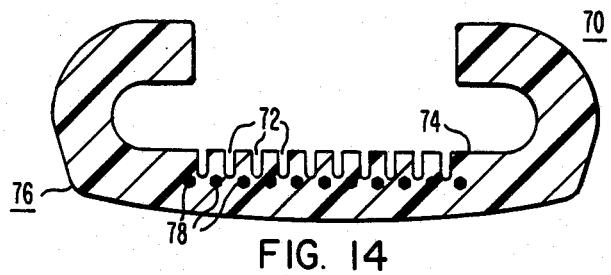
FIGS. 14 and 15 illustrate steps of reinforcing the butt joint area, wherein the grooves are extruded into the handrail at the time the main body of the handrail is extruded.
Figure 15:
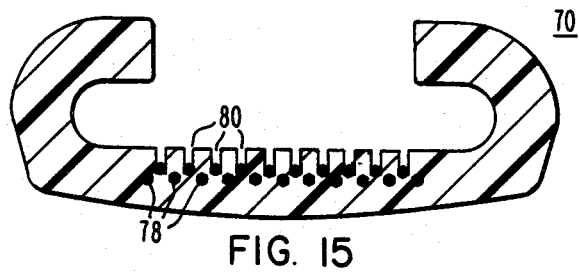

More specifically, as shown in FIG. 14, an extruded handrail 70 is provided which may be similar in all respects to handrail 10, except a plurality of spaced grooves 72 are extruded into the drive surface 74 at the same time body portion 76 is formed. As illustrated, inextensible members 78 embedded in body member 78 may form a row which is below the bottom of the grooves 72. Inextensible reinforcing members 80 are disposed in grooves 72 and bonded thereto. Members 80 are preferably pre-coated with elastomeric material in a manner similar to members 68 of FIG. 13. Grooves 72 may also be formed such that they enable the reinforcement members to be placed in the same row as the inextensible members which are already embedded in the handrail, as desired. Grooves 72, in addition to functioning in the reinforcement of the handrail butt joint, also function similar to tire tread, improving traction between the handrail and the drive rollers. This is especially true in outdoor applications where water may be present on the handrail.

Figure 16:
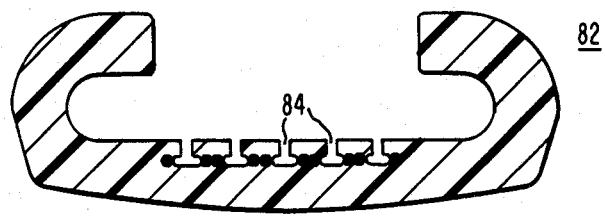
FIGS. 16 and 17 are similar to FIGS. 14 and 15, except illustrating another extruded groove arrangement which may be used.
Figure 17:
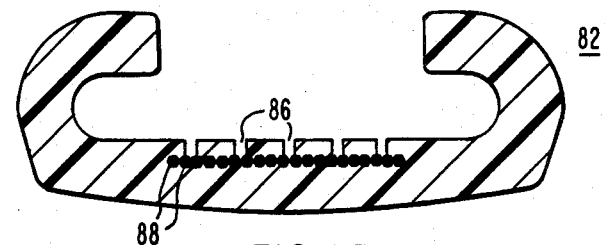

FIGS. 16 and 17 illustrate an extruded handrail 82 which also has extruded grooves 84 therein. Grooves 84 place the reinforcement members 86 on the same level as the embedded inextensible members 88. Handrail 82 is flexed to open up and enlarge the openings to the grooves, to allow pre-coated members having a pair of reinforcement cables 86 disposed in side-by-side relationship.

We claim as our invention:

1. A method of splicing first and second ends of a length of extruded flexible handrail to form a continuous loop, with the handrail including a body portion having a substantially C-shaped cross-sectional configuration which defines a substantially flat inner drive surface, and with the body portion being formed of an elastomeric, thermoplastic material having a plurality of spaced, longitudinally extending inextensible members embedded therein which extend substantially from end-to-end of the length, comprising the steps of:

squaring the first and second ends of said length,
aligning the first and second ends of said length to form a tight butt joint, with each end of each inextensible member adjacent to the first end of said length being aligned with a like positioned end of an inextensible member adjacent to the second end of said length, and with said aligned ends of said inextensible members being spaced from one another in the tight butt joint to prevent interference,
cutting parallel, longitudinally extending grooves into the flat inner drive surface of the body portion, with said grooves being located in the spaces between the plurality of inextensible members and extending through, and for a predetermined dimension on each side of, said butt joint,
placing predetermined lengths of inextensible members and elastomeric material into the grooves, to interleave said placed inextensible members with said aligned embedded inextensible members, with certain of said placed inextensible members extending for a dimension of at least about twelve inches on each side of said butt joint,
and bonding the added elastomeric material to the surfaces which define the grooves, to secure the predetermined lengths of inextensible members therein.

2. The method of claim 1 wherein the bonding step also simultaneously bonds the mating surface of the butt joint to one another.

3. The method of claim 1 including the step of bonding the mating surfaces of the butt joint to one another, prior to the step of cutting the grooves.

4. The method of claim 1 wherein the steps of placing lengths of inextensible members and elastomeric material into the grooves and bonding the elastomeric material thereto, includes the steps of placing lengths of clean inextensible members into the grooves, and heating separate elastomeric material so it flows into the grooves and surrounds the clean inextensible members placed therein.

5. The method of claim 1 wherein the step of placing lengths of inextensible members and elastomeric material into the grooves includes the steps of pre-coating the lengths of inextensible members with elastomeric material to provide a cross-sectional configuration complementary to the cross-sectional configuration of the grooves, placing the pre-coated lengths into the grooves, and the bonding step includes the step of heating the material in the butt joint to bond the pre-coated lengths to the body portion of the handrail.

6. The method of claim 5 wherein the step of cutting the grooves cuts grooves having a substantially rectangular cross-sectional configuration, and the step of pre-coating the lengths of inextensible members forms a substantially rectangular cross-sectional configuration.

7. The method of claim 5 wherein the step of cutting the grooves cuts the grooves such that they have a semicircular cross-sectional configuration at the bottom of the grooves, and the step of pre-coating the lengths of inextensible members forms at least a matching semicircular cross-sectional configuration.

8. The method of claim 1 wherein the predetermined lengths of the inextensible members are all the same, with the placing step aligning the ends of the inextensible members transversely across the width dimension of the handrail, on each side of the butt joint.

9. The method of claim 1 wherein the predetermined lengths of the inextensible members are selected to provide a predetermined number of different lengths, with the placing step staggering the ends of the inextensible members transversely across the width dimension of the handrail, on each side of the butt joint, in a predetermined pattern selected to feather out bending stress concentration between the butt joint and the adjacent portions of the handrail.

10. A method of splicing first and second ends of a length of extruded flexible handrail to form a continuous loop, with the handrail including a body portion having a substantially C-shaped cross-sectional configuration which defines a substantially flat inner drive surface, and with the body portion being formed of an elastomeric, thermoplastic material having a plurality of spaced, longitudinally extending inextensible members embedded therein which extend substantially from end-to-end of the length, comprising the steps of:
squaring the first and second ends of said length,
cutting a thin cross-sectional slice near an end of the length of handrail, and removing the pieces of inextensible members from said slice,
aligning the first and second ends of said length to form a tight butt joint, with said aligning step aligning the first and second ends of the length with said slice therebetween, such that the tight butt joint includes said slice,
cutting parallel, longitudinally extending grooves into the flat inner drive surface of the body portion, with said grooves being located in the spaces between the plurality of inextensible members and extending through, and for a predetermined dimension on each side of, said butt joint,
placing predetermined lengths of inextensible members and elastomeric material into the grooves,
and bonding the added elastomeric material to the surfaces which define the grooves, to secure the predetermined lengths of inextensible members therein.

11. The method of claim 10 wherein the bonding step also simultaneously bonds the mating surfaces of the butt joint to one another.

12. The method of claim 10 including the step of bonding the mating surfaces of the butt joint to one another, prior to the step of cutting the grooves.

13. A method of splicing first and second ends of a length of extruded flexible handrail to form a continuous loop, with the handrail including a body portion having a substantially C-shaped cross-sectional configuration which defines a substantially flat inner drive surface, and with the body portion being formed of an elastomeric, thermoplastic material having a plurality of spaced, longitudinally extending inextensible members embedded therein which extend substantially from end-to-end of the length, comprising the steps of:
squaring the first and second ends of said length, said squaring step including the steps of cutting the handrail with a liquid-cooled cut-off wheel, resulting in the cut ends of the inextensible members receding into the body portion, and leaving a smooth cut end of elastomeric material,
aligning the first and second ends of said length to form a tight butt joint,
cutting parallel, longitudinally extending grooves into the flat inner drive surface of the body portion, with said grooves being located in the spaces between the plurality of inextensible members and extending through, and for a predetermined dimension on each side of, said butt joint,
placing predetermined lengths of inextensible members and elastomeric material into the grooves,
and bonding the added elastomeric material to the surfaces which define the grooves, to secure the predetermined lengths of inextensible members therein.

14. A method of splicing first and second ends of a length of extruded flexible handrail to form a continuous loop, with the handrail including a body portion having a substantially C-shaped cross-sectional configuration which defines a substantially flat inner drive surface, and with the body portion being formed of an elastomeric, thermoplastic material having a plurality of spaced, longitudinally extending inextensible members embedded therein which extend substantially from end-to-end of the length, comprising the step of:
extruding parallel, longitudinally extending grooves of predetermined cross-sectional configuration into the flat inner drive surface of the body portion at the time said body portion is extruded,
squaring the first and second ends of said length, with said squaring step including the steps of cutting the handrail with a liquid cooled cut-off wheel, resulting in the cut ends of the inextensible members receding into the body portion and leaving a smooth cut end of elastomeric material,
aligning the first and second ends of said length to form a tight butt joint,
placing predetermined lengths of inextensible members and elastomeric material into the grooves, such that they extend through and for predetermined dimensions on both sides of the butt joint,
and bonding the predetermined lengths of inextensible members and elastomeric material to the surfaces which define the grooves.

15. A method of splicing first and second ends of a length of extruded flexible handrail to form a continuous loop, with the handrail including a body portion having a substantially C-shaped cross-sectional configuration which defines a substantially flat inner drive surface, and with the body portion being formed of an elastomeric, thermoplastic material having a plurality of spaced, longitudinally extending inextensible members embedded therein which extend substantially from end-to-end of the length, comprising the steps of:
extruding parallel, longitudinally extending grooves of predetermined cross-sectional configuration into the flat inner drive surface of the body portion at the time said body portion is extruded,
squaring the first and second ends of said length,
cutting a thin cross-sectional slice near an end of the length of the handrail, and removing the pieces of inextensible members from said slice,
aligning the first and second ends of said length to form a tight butt joint, with said aligning step aligning the first and second ends of the length with said slice disposed therebetween, such that the tight butt joint includes said slice,
placing predetermined lengths of inextensible members and elastomeric material into the grooves, such that they extend through and for predetermined dimensions on both sides of the butt joint,
and bonding the predetermined lengths of inextensible members and elastomeric material to the surfaces which define the grooves.

16. A method of splicing first and second ends of a length of extruded flexible handrail to form a continuous loop, with the handrail including a body portion having a substantially C-shaped cross-sectional configuration which defines a substantially flat inner drive surface, and with the body portion being formed of an elastomeric, thermoplastic material having a plurality of spaced, longitudinally extending inextensible members embedded therein which extend substantially from end-to-end of the length, comprising the steps of:

extruding parallel, longitudinally extending grooves of predetermined cross-sectional configuration into the flat inner drive surface of the body portion at the time said body portion is extruded, squaring the first and second ends of said length, aligning the first and second ends of said length to form a tight butt joint, with each end of each inextensible member adjacent to the first end of said length being aligned with a like positioned end of an inextensible member adjacent to the second end of said length, and with said aligned ends of said inextensible members being spaced from one another in the tight butt joint to prevent interference, placing predetermined lengths of inextensible members and elastomeric material into the grooves, such that they extend through and for predetermined dimensions on both sides of the butt joint to interleave said placed inextensible members with said aligned embedded inextensible members, with certain of said placed inextensible members extending for a dimension of at least about twelve inches on each side of said butt joint, and bonding the predetermined lengths of inextensible members and elastomeric material to the surfaces which define the grooves.

17. The method of claim 10 wherein the step of placing lengths of inextensible members and elastomeric material into the grooves includes the steps of pre-coating the lengths of inextensible members with elastomeric material to provide a cross-sectional configuration complementary to the cross-sectional configuration of the grooves, and placing the pre-coated lengths into the grooves, and the bonding step includes heating the material in the butt joint to bond the pre-coated lengths to the body portion of the handrail.

18. The method of claim 10 wherein the predetermined lengths of the inextensible members are all the same, with the placing step aligning the ends of the inextensible members transversely across the width dimension of the handrail, on each side of the butt joint.

19. The method of claim 10 wherein the predetermined lengths of the inextensible members are selected to provide a predetermined number of different lengths, with the placing step staggering the ends of the inextensible members transversely across the width dimension of the handrail, on each side of the butt joint, in a predetermined pattern selected to feather out bending stress concentration between the butt joint and the adjacent portions of the handrail.

20. The method of claim 10 wherein the bonding step also simultaneously bonds the mating surfaces of the butt joint to one another.

21. The method of claim 15 wherein the bonding step also simultaneously bonds the mating surfaces of the butt joint to one another.

* * * * *